United States Patent
Sohn et al.

(10) Patent No.: US 8,266,278 B2
(45) Date of Patent: Sep. 11, 2012

(54) APPARATUS AND METHOD FOR VISUALIZING NETWORK STATE BY USING GEOGRAPHIC INFORMATION

(75) Inventors: Seongyoung Sohn, Daejeon (KR); Beomhwan Chang, Daejeon (KR); Chiyoon Jeong, Daejeon (KR); Geonlyang Kim, Daejeon (KR); Jonghyun Kim, Daejeon (KR); Jongho Ryu, Cheonan (KR); Jungchan Na, Daejeon (KR); Jongsoo Jang, Daejeon (KR); Sungwon Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 240 days.

(21) Appl. No.: 12/679,294
(22) PCT Filed: Nov. 22, 2007
(86) PCT No.: PCT/KR2007/005903
§ 371 (c)(1), (2), (4) Date: Mar. 19, 2010
(87) PCT Pub. No.: WO2009/038248
PCT Pub. Date: Mar. 26, 2009

(65) Prior Publication Data
US 2010/0257267 A1 Oct. 7, 2010

(30) Foreign Application Priority Data
Sep. 21, 2007 (KR) .................. 10-2007-0096537

(51) Int. Cl.
*G06F 15/173* (2006.01)
(52) U.S. Cl. ....................... 709/224; 709/223
(58) Field of Classification Search .............. 709/224, 709/223, 225; 726/2, 3, 22, 23, 24, 25; 345/440, 345/440.1, 440.2, 441–443; 715/733–737, 715/741–743
See application file for complete search history.

(56) References Cited

U.S. PATENT DOCUMENTS

| | | | |
|---|---|---|---|
| 7,100,204 B1 | 8/2006 | Myllymaki et al. | |
| 7,546,637 B1 * | 6/2009 | Agbabian et al. | 726/23 |
| 7,593,013 B2 * | 9/2009 | Agutter et al. | 345/440 |
| 7,873,985 B2 * | 1/2011 | Baum | 726/2 |

(Continued)

OTHER PUBLICATIONS

Gregory John Conti, "Countering Network Level Denial of Information Attacks Using Information Visualization," A Dissertation Presented to the Academic Faculty, In Partial Fulfillment of the Requirements for the Degree Doctor of Philosophy in the College of Computing, May 2006, pp. 1-185, Georgia Institute of Technology, U.S.A.

James A. Muir et al., "Internet Geolocation and Evasion," Apr. 10, 2006, pp. 1-22, School of Computer Science Carleton University, Ottawa, Canada.

(Continued)

*Primary Examiner* — Wing Chan
*Assistant Examiner* — Ruolei Zong

(57) ABSTRACT

Disclosed is an apparatus for displaying the state of a network to enable a user to intuitively recognize a network security situation. The disclosed apparatus for displaying the state of a network includes: a security event collecting unit that collects security events from the outside; an IP address converting unit that converts a source IP address and a destination IP address in characteristic data of the collected security events into geographic information on the basis of information stored in a geographic information database; and a network state display unit that displays the flow of security events for each protocol between a source and a destination as an image including a globe shape, on the basis of the characteristic data and the geographic information transmitted from the IP address converting unit.

16 Claims, 2 Drawing Sheets

U.S. PATENT DOCUMENTS

| | | | |
|---|---|---|---|
| 7,930,256 B2* | 4/2011 | Gonsalves et al. | 706/11 |
| 2007/0033279 A1* | 2/2007 | Battat et al. | 709/224 |
| 2007/0047438 A1* | 3/2007 | Malloy et al. | 370/230 |
| 2007/0055782 A1* | 3/2007 | Wright et al. | 709/227 |
| 2007/0220595 A1 | 9/2007 | M'Raihi et al. | |

OTHER PUBLICATIONS

International Search Report for PCT/KR2007/005903 filed on Nov. 22, 2007.

Written Opinion of the International Searching Authority for PCT/KR2007/005903 filed on Nov. 22, 2007.

* cited by examiner

[Fig. 1]
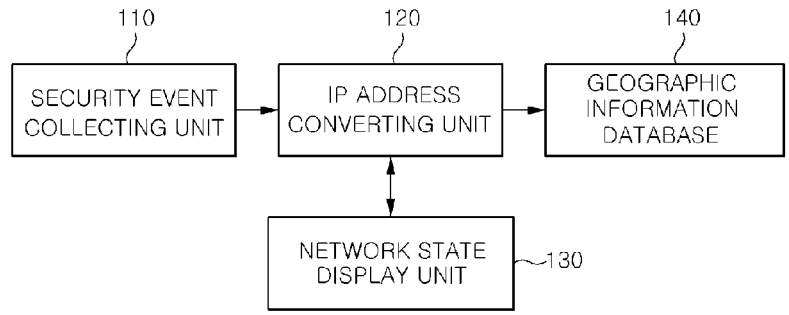
[Fig. 2]
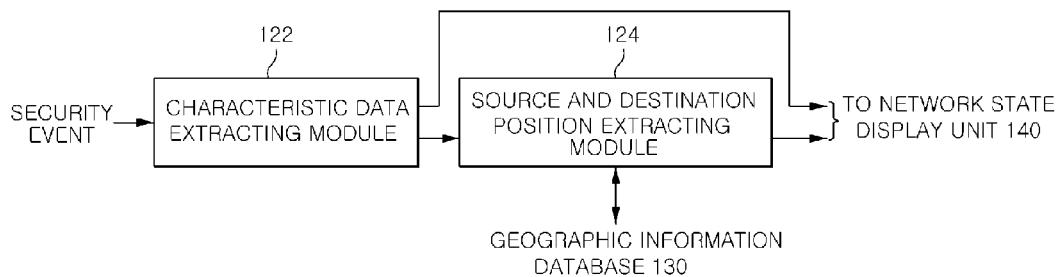
[Fig. 3]
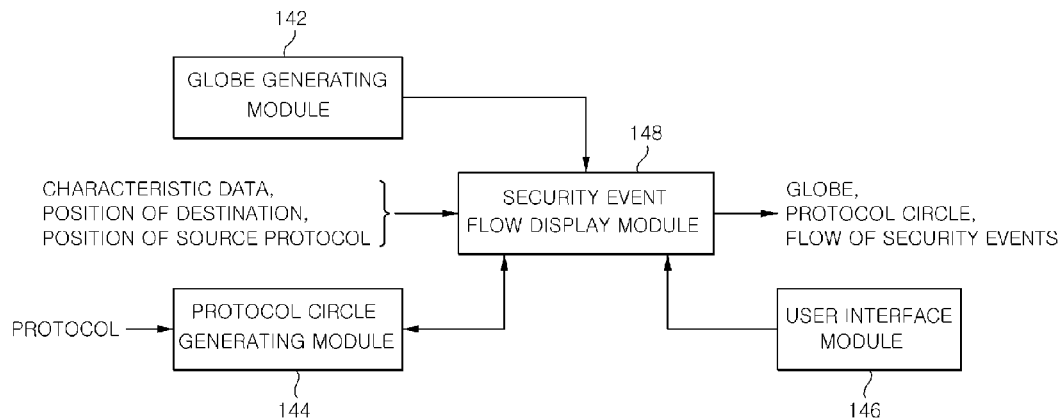

[Fig. 4]
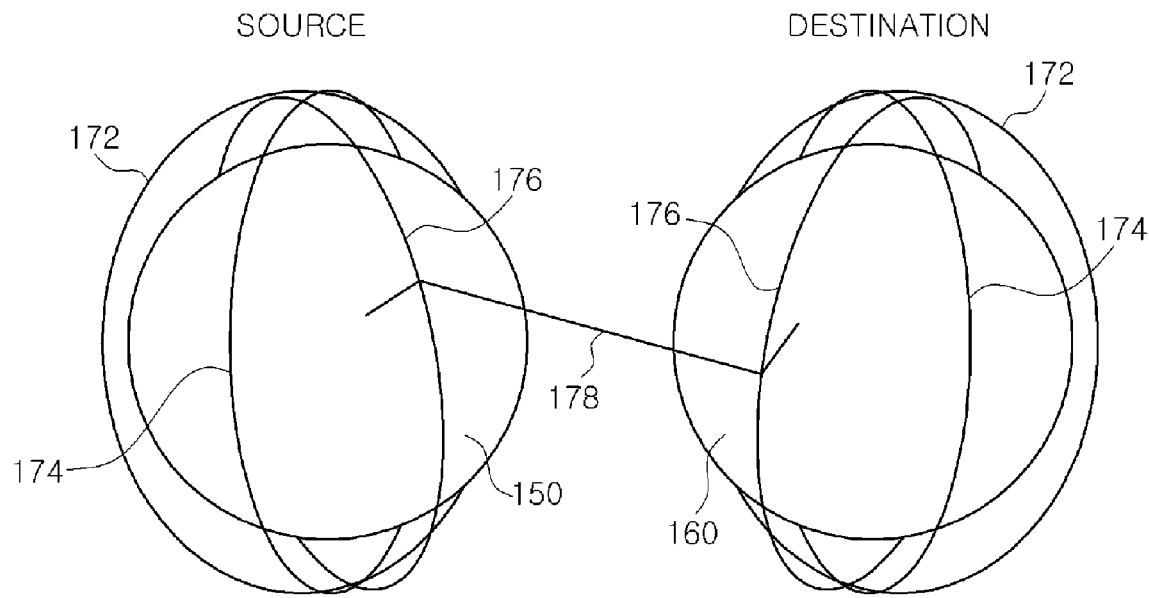
[Fig. 5]
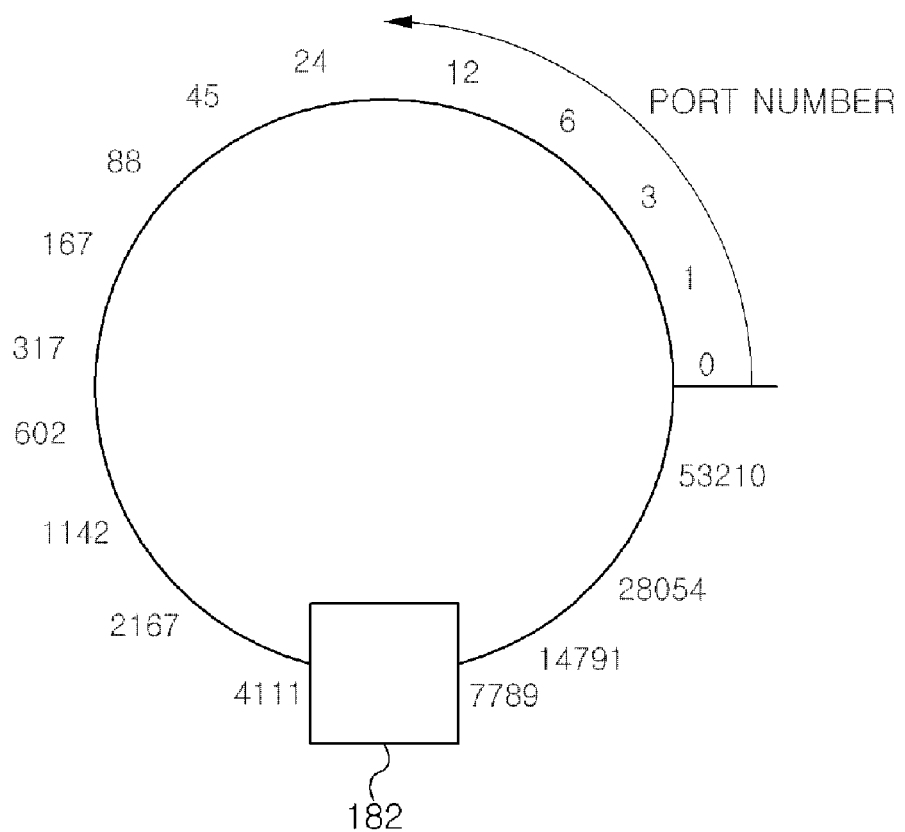

APPARATUS AND METHOD FOR VISUALIZING NETWORK STATE BY USING GEOGRAPHIC INFORMATION

TECHNICAL FIELD

The present invention relates to a network security, and more particularly, to an apparatus and method for displaying the state of a network between a source and a destination.

This work was supported by the IT R&D program of MIC/ IITA. [2007-S-022-01, The Development of Smart Monitoring and Tracing System against Cyber-attack in ALL-IP Network]

BACKGROUND ART

In recent years, with an increase in the use of a network, illegal access to the network has increased. Therefore, the importance of a security technique for detecting illegal attacks and network errors and interrupting the access has increased.

In the related art, the ratio of any one of traffic information items of a network (or a system), such as an address, a protocol, a port number, and the number of packet, is used to analyze a change in the corresponding item, in order to detect network errors (that is, abnormal situations caused by attacks). As another known technique, data transmitted over a network is displayed on a coordinate plane or as a geometric figure according to a predetermined protocol, thereby displaying the abnormal situations of the entire network (Reference Document 1; Korean Patent Application No. 10-2003-0008826, and Reference Document 2; IEEE Network Vol. 18, No. 5, PP. 30-39, September/October 2004, Hyogon Kim, Inhye Kang, Saewoong Bahk, Real-Time Visualization of Network Attacks on High-Speed Links).

The known methods cannot display details of the current state of the network on one screen. Therefore, it is difficult for a user to intuitively recognize a source of network security threat and places damaged by illegal attacks.

As described above, when the user or the administrator cannot intuitively recognize the current security situation of the network, it is difficult to rapidly cope with the abnormal situations of the network, which results in an increase in damage.

DISCLOSURE OF INVENTION

Technical Problem

The invention has been finalized in an effort to solve the above-mentioned problems, and an object of the invention is to provide an apparatus and method for displaying the state of a network using geographic information that is capable of enabling a user to intuitively recognize the current network security situation by displaying, on globes, the actual geometric positions of a source and a destination and the flow of security events for each protocol, on the basis of geographic information and characteristic data included in security events.

Technical Solution

According to an aspect of the invention, there is provided an apparatus for displaying the state of a network using geographic information. The apparatus includes: a security event collecting unit that collects security events from the outside; an IP address converting unit that converts a source IP address and a destination IP address in characteristic data of the collected security events into geographic information on the basis of information stored in a geographic information database; and a network state display unit that displays the flow of security events for each protocol between a source and a destination as an image including a three-dimensional globe shape, on the basis of the characteristic data and the geographic information transmitted from the IP address converting unit.

The IP address converting unit may include: a characteristic data extracting module that extracts the characteristic data from the security events collected by the security event collecting unit; and a source and destination position extracting module that extracts, from information stored in the geographic information database, the actual position of the source corresponding to the source IP address and the actual position of the destination corresponding to the destination IP address in the extracted characteristic data.

The source and destination position extracting module may use information including a latitude and longitude for each IP stored in the geographic information database.

The network state display unit may display a first globe indicating the actual position of the source corresponding to the source IP address, a second globe indicating the actual position of the destination corresponding to the destination IP address, and one or more protocol circles that are arranged around each of the first and second globes.

Port numbers of protocols may be mapped along the circumference of each of the protocol circles.

The network state display unit may display the one or more protocol circles in different colors.

The network state display unit may display a line linking the actual position of the source and the actual position of the destination such that the line passes through the protocol circle of the first globe and the protocol circle of the second globe.

The line linking the actual position of the source and the actual position of the destination may pass through the protocol circles corresponding to the same protocol in the first globe and the second globe.

The network state display unit may display the number of security events for each port as a figure having a predetermined size on the protocol circle.

When a signal indicating the selection of a specific port is input, the network state display unit may display only the flow of security events related to the selected port.

The network state display unit may include: a globe generating module that generates a first globe for displaying the actual position of the source corresponding to the source IP address and a second globe for displaying the actual position of the destination corresponding to the destination IP address; a protocol circle generating module that generates at least one protocol circle that is arranged around each of the first and second globes; and a security event flow display module that displays a line linking the actual position of the source and the actual position of the destination, the line passing through the protocol circle of the first globe and the protocol circle of the second globe.

According to another aspect of the invention, there is provided a method of displaying the state of a network using geographic information. The method includes: a security event collecting step of collecting security events from the outside; an IP address converting step of converting a source IP address and a destination IP address in characteristic data of the security events collected in the security event collecting step into geographic information; and a network state displaying step of displaying the flow of security events for each protocol between a source and a destination as an image including a three-dimensional globe shape, on the basis of the characteristic data and the geographic information converted in the IP address converting step.

The IP address converting step may include: a characteristic data extracting step of extracting the characteristic data from the security events collected in the security event collecting step; and a source and destination position extracting step of extracting, from information stored in a geographic information database, the actual position of the source corresponding to the source IP address and the actual position of the destination corresponding to the destination IP address in the characteristic data extracted in the characteristic data extracting step.

The network state displaying step may display a first globe indicating the actual position of the source corresponding to the source IP address, a second globe indicating the actual position of the destination corresponding to the destination IP address, and one or more protocol circles that are arranged around each of the first and second globes.

Port numbers of protocols may be mapped along the circumference of each of the protocol circles.

The network state displaying step may display a line linking the actual position of the source and the actual position of the destination such that the line passes through the protocol circle of the first globe and the protocol circle of the second globe.

The network state displaying step may display the number of security events for each port as a figure having a predetermined size on the protocol circle.

When a signal indicating the selection of a specific port is input, the network state displaying step may display only the flow of security events related to the selected port.

Advantageous Effects

According to the structure of the invention, since the actual positions of a source and a destination are displayed on globes, a user can rapidly and accurately check places where security events are generated. That is, since the globe that everybody can easily understand is used, it is possible to easily check the actual positions of the destination and the source of security events.

Further, the protocol circles are used to display a plurality of protocols and the number of security events for each port of the protocols on one screen together with the globes. Therefore, an administrator can easily check the current state of a network.

Furthermore, the invention can be automated by a program. In this case, it is possible to rapidly cope with errors in the network, without the intervention of an administrator.

BRIEF DESCRIPTION OF THE DRAWINGS

FIG. 1 is a block diagram illustrating an apparatus for displaying the state of a network using geographic information according to an embodiment of the invention.

FIG. 2 is a block diagram illustrating the internal structure of an IP address converting unit shown in FIG. 1.

FIG. 3 is a block diagram illustrating the internal structure of a network state display unit shown in FIG. 1.

FIG. 4 is a diagram illustrating an example of an image displayed by a network state display unit shown in FIG. 1.

FIG. 5 is a diagram illustrating an example of a protocol circle shown in FIG. 4.

BEST MODE FOR CARRYING OUT THE INVENTION

Hereinafter, an apparatus and method of displaying the state of a network using geographic information according to an exemplary embodiment of the invention will be described with reference to the accompanying drawings.

FIG. 1 is a block diagram illustrating an apparatus for displaying the state of a network using geographic information according to an embodiment of the invention. The apparatus includes a security event collecting unit 110, an IP address converting unit 120, a geographic information database 130, and a network state display unit 140.

The security event collecting unit 110 collects security events transmitted from a network security apparatus (not shown), such as a fire wall, an intrusion detection system, or a router.

The IP address converting unit 120 extracts geographic information corresponding to a source IP address and a destination IP address in characteristic data of the collected security events from the geographic information database 130. That is, the IP address converting unit 120 converts the source IP address into longitude and latitude, which are geographic information corresponding to the source IP address, and converts the destination IP address into longitude and latitude, which are geographic information corresponding to the destination IP address. In the specification of the invention, the characteristic data means a small number of characteristics required to check a network error, among various characteristics of network packets transmitted from a source to a destination. In general, the network packets include various attributes in addition to the source IP address, the destination IP address, a protocol, a destination port, and a source port. For example, in the following description, the above-mentioned attributes (that is, the source IP address, the destination IP address, the protocol, the destination port, and the source port) are defined as characteristic data. The IP address is a general Internet address in the form of, for example, "xxx.xxx.xxx.xxx". However, any type of address may be used as the IP address as long as it can identify geographic information.

The geographic information database 130 stores information on the latitude, longitude, country, and city of each IP.

The network state display unit 140 displays on a screen the flow of the security event of each protocol between a source and a destination as a three-dimensional image including a globe shape, on the basis of the characteristic data and geographic information transmitted from the IP address converting unit 120. The flow of security events displayed on the screen by the network state display unit 140 may depend on the amount of data displayed on the screen. For example, the flow of security events may be displayed on the basis of information that is continuously provided from the IP address converting unit 120. Alternatively, the flow of security events may be displayed on the basis of information that is provided from the IP address converting unit 120 at a predetermined time interval, for example, at a time interval of about 10 minutes. The flow of security events may be displayed by the two methods. The flow of security events means network packets transmitted from a source to a destination. That is, in FIG. 4, which will be described below, the flow of security events may mean a line linking the source address, the source port, the protocol, the destination port, and the destination address.

In this embodiment, the geographic information database 130 is separately configured from the IP address converting unit 120. However, if necessary, the geographic information database 130 may be provided in the IP address converting unit 120.

FIG. 2 is a block diagram illustrating the internal structure of the IP address converting unit 120 shown in FIG. 1. The IP address converting unit 120 includes a characteristic data extracting module 122 and a source and destination position extracting module 124.

The characteristic data extracting module 122 extracts characteristic data (the source IP address, the destination IP address, the protocol, the destination port, and the source port) from the security events collected by the security event collecting unit 110.

The source and destination position extracting module 124 extracts, from information stored in the geographic information database 130, the actual position of a source corresponding to the source IP address in the characteristic data that is extracted by the characteristic data extracting module 122, and the actual position of a destination corresponding to the destination IP address in the characteristic data.

FIG. 3 is a block diagram illustrating the internal structure of the network state display unit 140 shown in FIG. 1. The network state display unit 140 includes a globe generating module 142, a protocol circle generating module 144, a user interface module 146, and a security event flow display module 148.

The globe generating module 142 generates a first globe for displaying the actual position of the source corresponding to the source IP address and a second globe for displaying the actual position of the destination corresponding to the destination IP address.

The protocol circle generating module 144 generates at least one protocol circle that is arranged around each of the first and second globes, on the basis of an input protocol. The protocol circle indicates a protocol used for the flow of security events from the source to the destination (for example, TCP, UDP, or other protocols). The protocol circle indicates the number of security events for each port of the protocol.

The user interface module 146 enables a user to use a mouse or a keyboard to select a specific port.

The security event flow display module 148 three-dimensionally displays the flow of security events on the basis of input characteristic data and the actual positions of the destination and the source. The security event flow display module 148 displays the actual position of the source on the first globe and the actual position of the destination on the second globe. The security event flow display module 148 links the actual position of the source and the actual position of the destination. Specifically, a line linking the actual position of the source and the actual position of the destination passes through one point on the protocol circle of the first globe and one point on the protocol circle of the second globe.

When receiving a signal indicating the selection of a specific port from the user interface module 146, the security event flow display module 148 displays only the flow of security events related to the selected port.

FIG. 4 is a diagram illustrating an example of an image displayed by the network state display unit 140 shown in FIG. 1. A first globe 150 indicating the actual position of the source corresponding to a source IP address, a second globe 160 indicating the actual position of the destination corresponding to a destination IP address, and protocol circles 172, 174, and 176 that are arranged around each of the first and second globes 150 and 160 and indicate the number of security events for each port of a corresponding protocol are displayed on one screen. For clarity of explanation, maps are not displayed on the first and second globes 150 and 160. However, actually, the maps are displayed on the first and second globes 150 and 160.

The protocol circles 172, 174, and 176 are displayed in different colors, which makes it possible to a user or an administrator to intuitively recognize a network error, such as the concentration of security events on a port of a specific protocol, with ease.

A line 178 linking the actual position of the source and the actual position of the destination passes through one point on any one of the protocol circles 172, 174, and 176 of the first globe 150 and one point on any one of the protocol circles 172, 174, and 176 of the second globe 150. The line 178 linking the actual position of the source and the actual position of the destination passes through protocol circles (the protocol circle 176 in FIG. 4) corresponding to the same protocol of the first globe 150 and the second globe 160.

For clarity of explanation, FIG. 4 shows only the line 178. However, actually, a plurality of lines 178 are displayed. The line 178 indicates the flow of one security event.

In FIG. 4, the first and second globes 150 and 160 seem to be fixed. However, actually, the first and second globes 150 and 160 rotate. In FIG. 4, the flow of security events may occur in the rear sides of the first and second globes 150 and 160. Therefore, the network state display unit 140 rotates the first and second globes 150 and 160 at a predetermined speed or by a predetermined angle at a predetermined time interval. Of course, even when a manual operation instruction is input through the user interface module 146, the network state display unit 140 rotates the first and second globes 150 and 160. Alternatively, the network state display unit 140 may rotate the screen shown in FIG. 4 in the right, left, upward, or downward directions.

Meanwhile, although not shown in the drawings, the network state display unit 140 may display a list of ports having high priority (that is, a list on which ports having a larger number of security events have higher priority) in the form of text. In this case, when the user or the administrator selects one port, the network state display unit 140 displays only the flow of security events related to the selected port, which makes it possible to improve user or administrator convenience.

In FIG. 4, three protocol circles are arranged around each of the first globe 150 and the second globe 160. However, the number of protocol circles may increase or decrease.

FIG. 5 is a diagram illustrating the protocol circles 172, 174, and 176 shown in FIG. 4. Port numbers of the protocols (for example, TCP, UDP, and other protocols) are mapped around the protocol circles 172, 174, and 176. The port numbers increase from port No. "0" in the counterclockwise direction in a log scale.

The number of security events generated from each port is indicated by the size of a predetermined shape (for example, a rectangle) 182 having the port number at the center thereof. For example, the larger the number of security events becomes, the larger the size of the rectangle 182 becomes. The number of security events may be displayed in the rectangle 182. Alternatively, the rectangle 182 having a predetermined size may be displayed at the center of the port number, and the number of security events may be displayed in the rectangle 182. Instead of the rectangle, other figures, such as a circle, may be displayed.

The number of security events may be displayed for every port. For example, the number of security events may be displayed for the top several ports, for example, the top three ports.

The protocol circles 172, 174, and 176 may be added or removed at the request of the user or the administrator.

Actually, a plurality of lines 178 corresponding to a plurality of flows of security events exist. Therefore, the rectangle 182 shown in FIG. 5 is not shown in FIG. 4. For example, when the user or the administrator selects any one of the protocol circles shown in FIG. 4, actually, the protocol circle shown in FIG. 5 is displayed on the screen.

The invention can also be embodied as computer-readable codes on a computer-readable recording medium. The computer-readable recording medium is any data storage device that can store data which can be read by a computer system. Examples of the computer-readable recording media include read only memories (ROMs), random access memories (RAMs), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the invention can be easily construed by programmers skilled in the art to which the present general inventive concept pertains.

Although the embodiment of the invention has been described above, it will be appreciated by those skilled in the art that changes and modifications of the invention may be made without departing from the principles and spirit of the invention, the scope of which is defined in the appended claims and their equivalents.

The invention claimed is:

1. An apparatus for displaying the state of a network using geographic information, comprising:
   a security event collecting unit embodied on a non-transitory computer readable medium and executed by a processor to collect security events from the outside;
   an IP address converting unit embodied on the non-transitory computer readable medium and executed by the processor to convert a source IP address and a destination IP address in characteristic data of the collected security events into corresponding geographic information on the basis of information stored in a geographic information database; and
   a network state display unit configured to display the flow of security events for each protocol between a source and a destination as an image including three-dimensional elements comprising a first globe shape and a second globe shape, on the basis of the characteristic data and the geographic information transmitted from the IP address converting unit, the first globe shape indicating an actual geographic position of the source corresponding to the source IP address and the second globe shape indicating an actual geographic position of the destination corresponding to the destination IP address, and further configured to display a plurality of protocol circles arranged around each of the first and second globes, each of the plurality of protocol circles corresponding to one of a plurality of network protocols.

2. The apparatus of claim 1, wherein the IP address converting unit includes:
   a characteristic data extracting module configured to extract the characteristic data from the security events collected by the security event collecting unit; and
   a source and destination position extracting module configured to extract, from information stored in the geographic information database, the actual position of the source corresponding to the source IP address and the actual position of the destination corresponding to the destination IP address in the extracted characteristic data.

3. The apparatus of claim 2, wherein the source and destination position extracting module uses information including a latitude and longitude for each IP address stored in the geographic information database.

4. The apparatus of claim 1, wherein port numbers of protocols are mapped along the circumference of each of the protocol circles.

5. The apparatus of claim 1, wherein the network state display unit is configured to display the one or more protocol circles in different colors.

6. The apparatus of claim 1, wherein the network state display unit is configured to display a line linking the actual geographic position of the source and the actual geographic position of the destination such that the line passes through one of the plurality of protocol circles of the first globe and one of the plurality of protocol circles of the second globe.

7. The apparatus of claim 6, wherein the line linking the actual position of the source and the actual position of the destination passes through the protocol circles corresponding to the same protocol in the first globe and the second globe.

8. The apparatus of claim 1, wherein the network state display unit displays the number of security events for each port as a figure having a predetermined size on the protocol circle.

9. The apparatus of claim 1, wherein, when a signal indicating the selection of a specific port is input, the network state display unit is configured to display only the flow of security events related to the selected port.

10. A method of displaying the state of a network using geographic information, comprising:
    a security event collecting step of collecting security events from the outside;
    an IP address converting step of converting a source IP address and a destination IP address in characteristic data of the security events collected in the security event collecting step into geographic information;
    a network state displaying step of displaying the flow of security events for each protocol between a source and a destination as an image including first and second globe shapes, on the basis of the characteristic data and the geographic information converted in the IP address converting step;
    displaying a plurality of protocol circles arranged around the first and second globes, each of the plurality of protocol circles corresponding to a network protocol;
    indicating an actual geographic position of a source corresponding to the source IP address on the first globe;
    indicating an actual geographic position of a destination corresponding to the destination IP address on the second globe; and
    displaying a plurality of protocol circles arranged around the first and second globes, each of the plurality of protocol circles corresponding to a network protocol.

11. The method of claim 10, wherein the IP address converting step includes:
    a characteristic data extracting step of extracting the characteristic data from the security events collected in the security event collecting step; and
    a source and destination position extracting step of extracting the actual geographic position of the source corresponding to the source IP address and the actual geographic position of the destination corresponding to the destination IP address in the characteristic data extracted in the characteristic data extracting step.

12. The method of claim 10, wherein port numbers of protocols are mapped along the circumference of each of the protocol circles.

13. The method of claim 10, wherein the network state displaying step displays a line linking the actual geographic position of the source and the actual geographic position of the destination such that the line passes through one of the plurality of protocol circles of the first globe and one of the plurality of protocol circles of the second globe.

14. The method of claim 10, wherein the network state displaying step displays the number of security events for each port as a figure having a predetermined size on each of the protocol circles.

15. The method of claim 10, wherein, when a signal indicating the selection of a specific port is input, the network state displaying step displays only the flow of security events related to the selected port.

16. A non-transitory computer readable medium including a computer executable program thereon, the non-transitory computer readable medium comprising:

code for collecting security events from the outside;

code for converting a source IP address and a destination IP address in characteristic data of the collected security events into corresponding geographic information on the basis of information stored in a geographic information database; and code for displaying the flow of security events for each protocol between a source and a destination as an image including three-dimensional elements comprising a first globe shape and a second globe shape, on the basis of the characteristic data and the geographic information transmitted from the IP address converting unit, the first globe shape indicating an actual geographic position of the source corresponding to the source IP address and the second globe shape indicating an actual geographic position of the destination corresponding to the destination IP address, and further configured to display a plurality of protocol circles arranged around each of the first and second globes, each of the plurality of protocol circles corresponding to one of a plurality of network protocols.

* * * * *